United States Patent

Yen

(10) Patent No.: US 8,390,945 B2
(45) Date of Patent: Mar. 5, 2013

(54) LENS MODULE HAVING NEBULIZED PORTIONS

(75) Inventor: Shih-Chieh Yen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/288,899

(22) Filed: Nov. 3, 2011

(65) Prior Publication Data

US 2013/0027787 A1    Jan. 31, 2013

(30) Foreign Application Priority Data

Jul. 28, 2011    (TW) .......................... 2011 1 0126828

(51) Int. Cl.
*G02B 7/02* (2006.01)
*G02B 9/08* (2006.01)

(52) U.S. Cl. ......... 359/819; 359/714; 359/738; 359/764

(58) Field of Classification Search .................. 359/714, 359/738, 763, 764, 819
See application file for complete search history.

(56) References Cited

U.S. PATENT DOCUMENTS

| | | | | |
|---|---|---|---|---|
| 2010/0220229 A1* | 9/2010 | Sano | ............................. | 359/764 |
| 2010/0253829 A1* | 10/2010 | Shinohara | ..................... | 359/764 |
| 2010/0254029 A1* | 10/2010 | Shinohara | ..................... | 359/764 |
| 2011/0134305 A1* | 6/2011 | Sano et al. | .................... | 359/764 |

* cited by examiner

*Primary Examiner* — Evelyn A. Lester
(74) *Attorney, Agent, or Firm* — Altis Law Group, Inc.

(57) ABSTRACT

A lens module includes a barrel, a first lens, a second lens, a third lens, and two spacers. The first lens, the second lens, and the third lens are received in the barrel from an object side to an image side of the lens module. Each lens includes an optical portion and a non-optical portion around the optical portion. The two spacers are respectively positioned on the non-optical portions of two adjacent lenses. The non-optical portion of the second lens includes a first contact portion and two second contact portions. The first contact portion contacts an inner sidewall of the barrel. The second contact portions respectively contact the first lens and the third lens and are arranged in an acute angle with respect to an optical axis of the lens module. The non-optical portion of the second lens excluding the first contact portion and the second contact portions is nebulized.

6 Claims, 5 Drawing Sheets

LENS MODULE HAVING NEBULIZED PORTIONS

BACKGROUND

1. Technical Field

The present disclosure relates to a lens module and, particularly, to a lens module having nebulized portions.

2. Description of Related Art

Because plastic lens are less expensive than glass lenses, plastic lenses are popular in lens modules. However, the optical quality of the plastic lenses is worse than that of the glass lenses. Such as, when a light source (such as an electronic torch) irradiates the lens module having the plastic lenses, the captured image will have many kinds of astigmatism.

Therefore, it is desirable to provide a lens module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
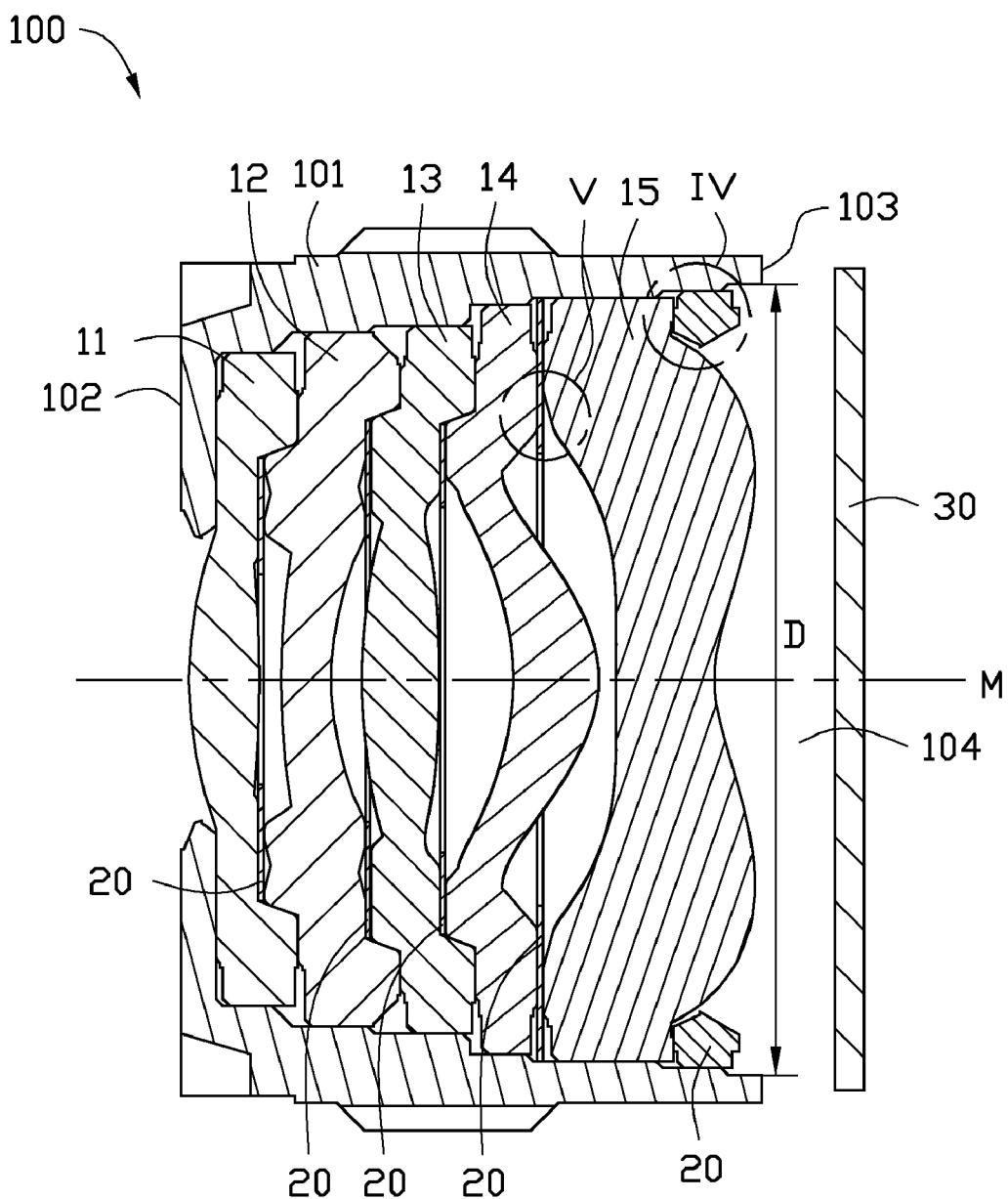
FIG. 1 is a schematic, cross-sectional view of a lens module, according to an embodiment, the lens module including a first lens, a second lens, a third lens, and a fourth lens.

Referring to FIG. 1, a lens module 100, according to an embodiment, includes a barrel 101, a first lens 11, a second lens 12, a third lens 13, a fourth lens 14, a fifth lens 15, five spacers 20, and an image sensor 30.

The barrel 101 is cylindrical, and includes a semi-enclosed object end 102, an image end 103, and a receiving space 104 communicating the object end 102 and the image end 103. In one embodiment, the inner diameter of the image end 103 is D, and D is equal to about 5.3 millimeter (mm).

The five lenses 11-15 are received in the receiving space 104 along the optical axis M of the lens module 100 from the object end 102 to the image end 103. Each of the five lenses 11-15 has an optical portion for imaging and a non-optical portion around the optical portion. Each of the five lenses 11-15 further has an object-side surface facing the object side of the zoom lens system 100 and an image-side surface facing the image side of the zoom lens system 100. When capturing an image, incident light rays enter the lens module 100, transmit through the five lenses 11-15, and reach the image sensor 30.

The five spacers 20 are made of elastic material, and received in the receiving space 104. Four of the five spacers 20 are each interposed between the non-optical portions of two adjacent lenses. The remainder one of the five spacers 20 is positioned on the image-side surface of the fifth lens 15.

Figure 2:
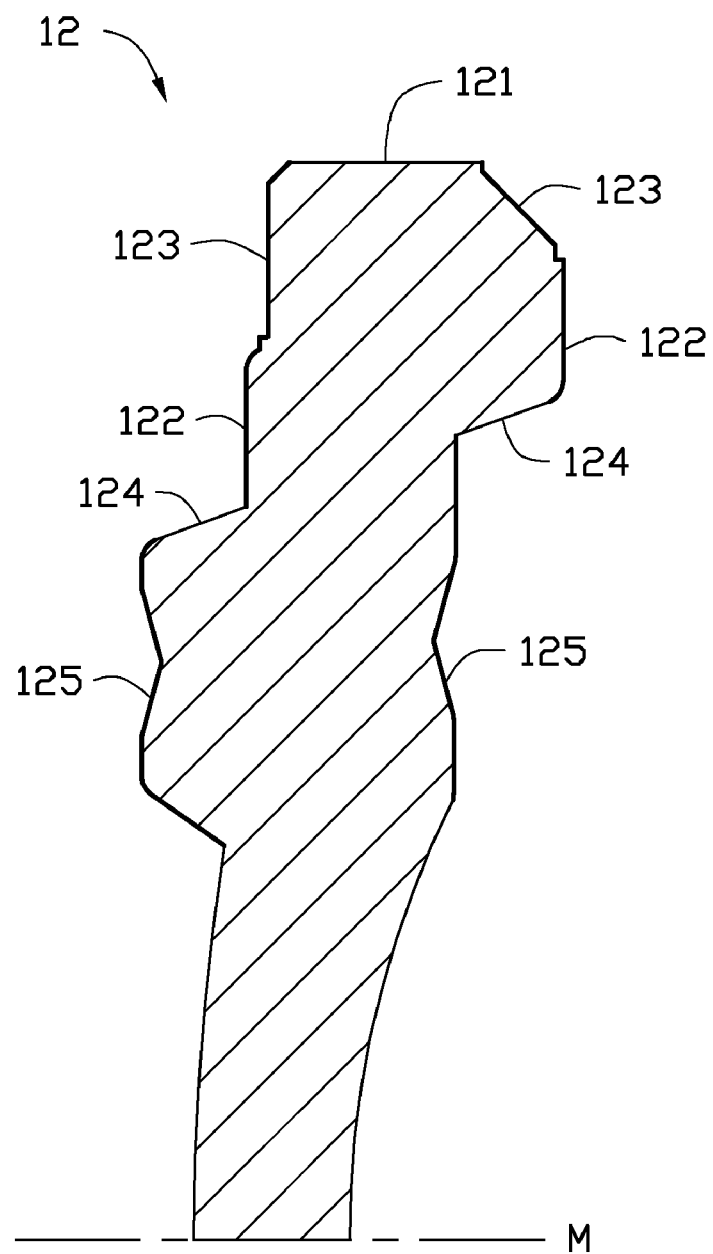
FIG. 2 is a schematic, cross-sectional view of half of the second lens of the lens module of FIG. 1.

Also referring to FIG. 2, the non-optical portion of the second lens 12 includes a first contact portion 121, two second contact portions 122, two connecting portions 123, two third contact portions 124, and two fourth contact portions 125.

The first contact portion 121 resists on the inner sidewall of the barrel 101. The two second contact portions 122 are respectively on the object-side surface and the image-side surface of the second lens 12, and are perpendicular to the optical axis of the lens module 100. One of the two second contact portions 122 abuts against the first lens 11, the other one of the two second contact portions 122 abuts against the third lens 13. The two connecting portions 123 are on the object-side surface and the image-side surface of the second lens 12 and are respectively connected between the first contact portion 121 and the corresponding second contact portions 122.

The two third contact portions 124 are on the object-side surface and the image-side surface of the second lens 12, and form an acute angle with the optical axis of the lens module 100. Each third contact portion 124 is connected to a respective one of the second contact portions 122. One of the two third contact portions 124 abuts against the first lens 11 and the other of the two third contact portions 124 abuts against the third lens 11.

The two fourth contact portions 125 are on the object-side surface and the image-side surface of the second lens 12, and respectively abut against the corresponding spacers 20. The two fourth contact portions 125 are respectively connected between the corresponding third contact portions 124 and the corresponding optical surface. The two second contact portions 122, the two connecting portions 123, and the four contact portions 125 are nebulized to reduce astigmatism in the image of the light source.

Figure 3:
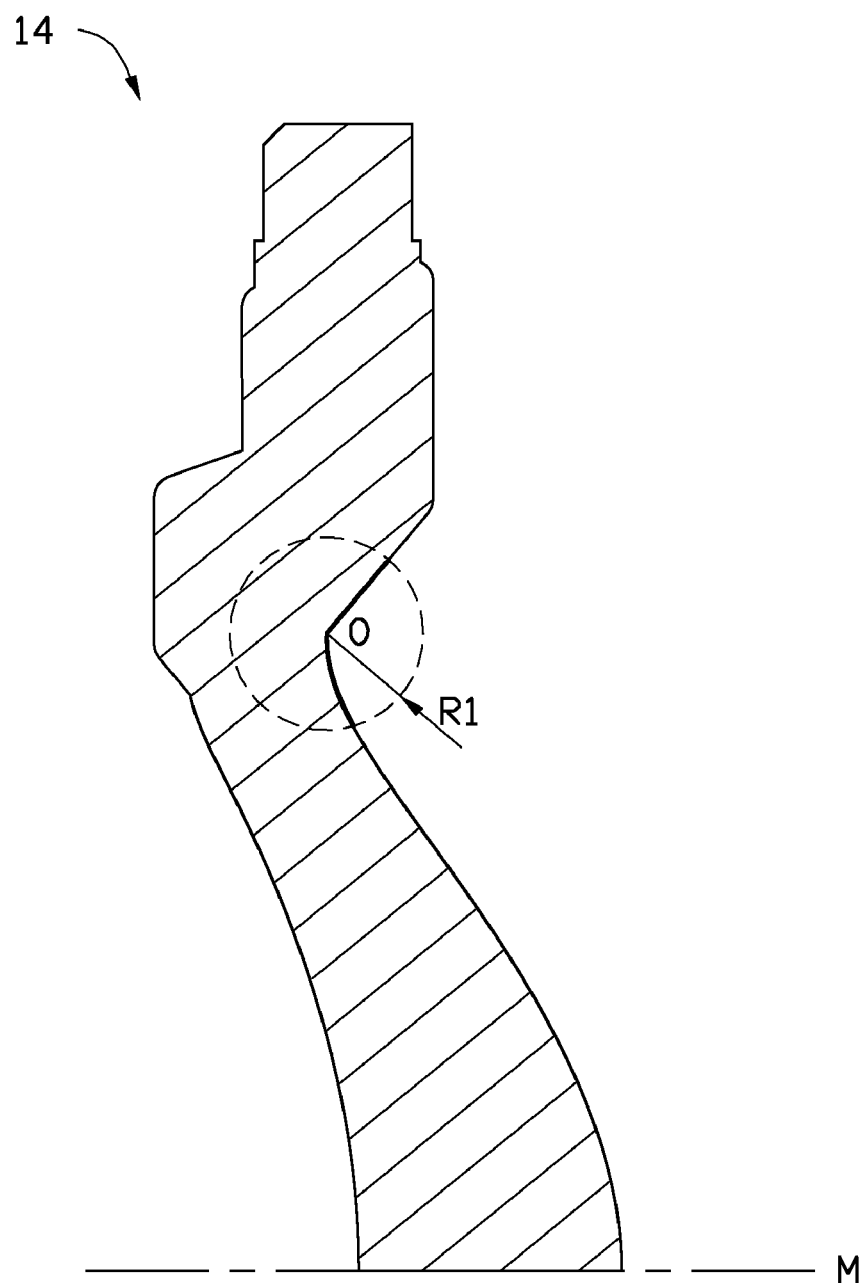
FIG. 3 is a schematic, cross-sectional view of half of the fourth lens of the lens module of FIG. 1.

Also referring to FIG. 3, the intersecting portion between the optical portion and the non-optical portion of the fourth lens 14 is nebulized. In particular, taking an intersection point O of the optical portion and the non-optical portion of the fourth lens 14 as a center, taking R1 as radius to draw a circle, the portion in the circle is nebulized, wherein $0<R1\leq0.3$ mm, $0<R1/D\leq0.0566$. In this embodiments, R1=0.1 millimeter (mm). And thus, when the angle between the light source and the optical axis of the lens module 100 is about 38°, the falcate astigmatism in the image of the light source can be reduced.

Figure 4:
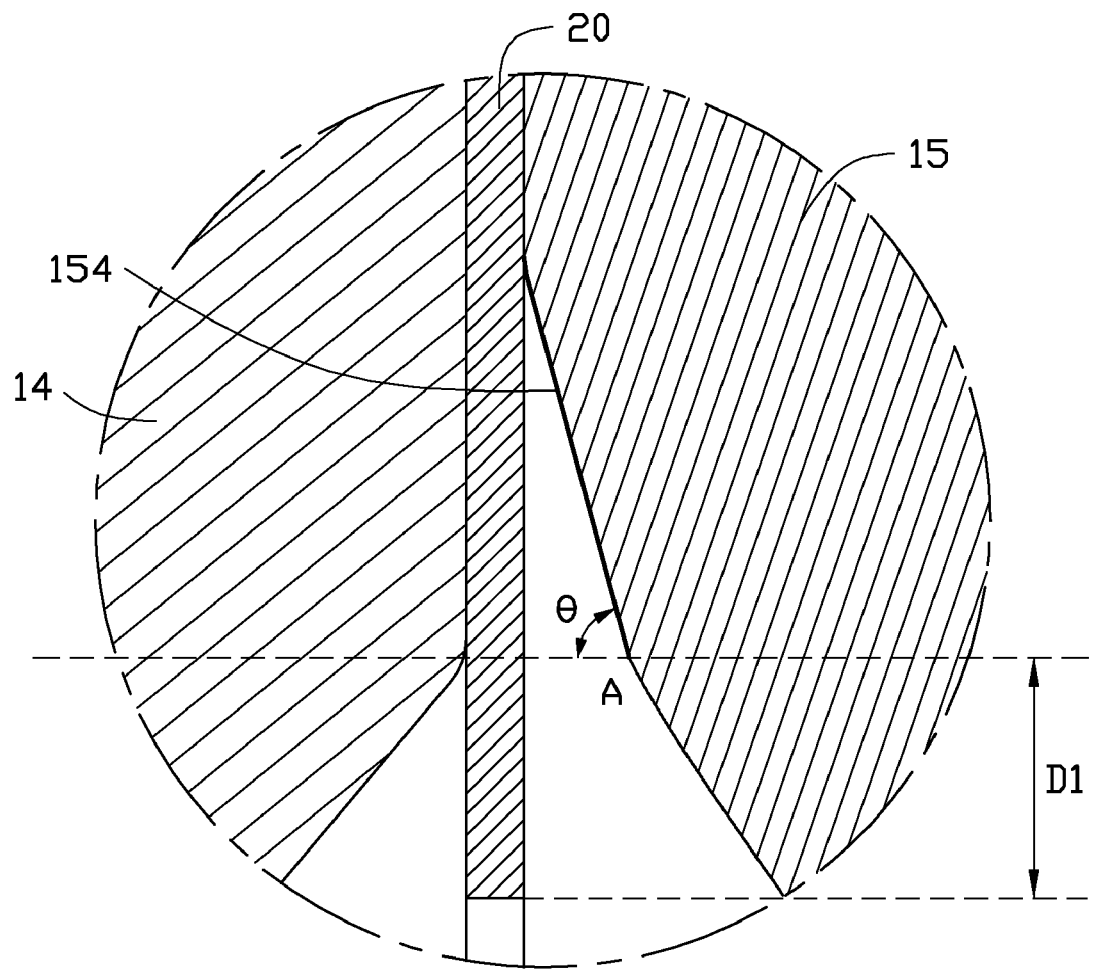
FIG. 4 is an enlarged view of a circled portion IV of the lens module of FIG. 1.

Also referring to FIG. 4, the non-optical portion which is on the object-side surface of the fifth lens 15 and is adjacent to the optical portion is cut off to form an inclined surface 154. The angle between the inclined surface 154 and the optical axis of the lens module 100 is θ, $30°\leq\theta\leq85°$. In this embodiment, θ=75°. The intersection point of the inclined surface 154 and the corresponding optical portion is marked as A. The distance between the intersection point A and the end of the corresponding spacer 20 adjacent to the optical axis M of the lens module 100 is D1, wherein $0.15\text{ mm}\leq D1\leq0.25$ mm, $0.0283\leq D1/D\leq0.0472$. In this embodiment, D1=0.17 mm. The inclined surface 154 is nebulized, and thus, when the angle between the light source and the optical axis of the lens module 100 is about 34°, the falcate astigmatism in the image of the light source can be eliminated.

Figure 5:
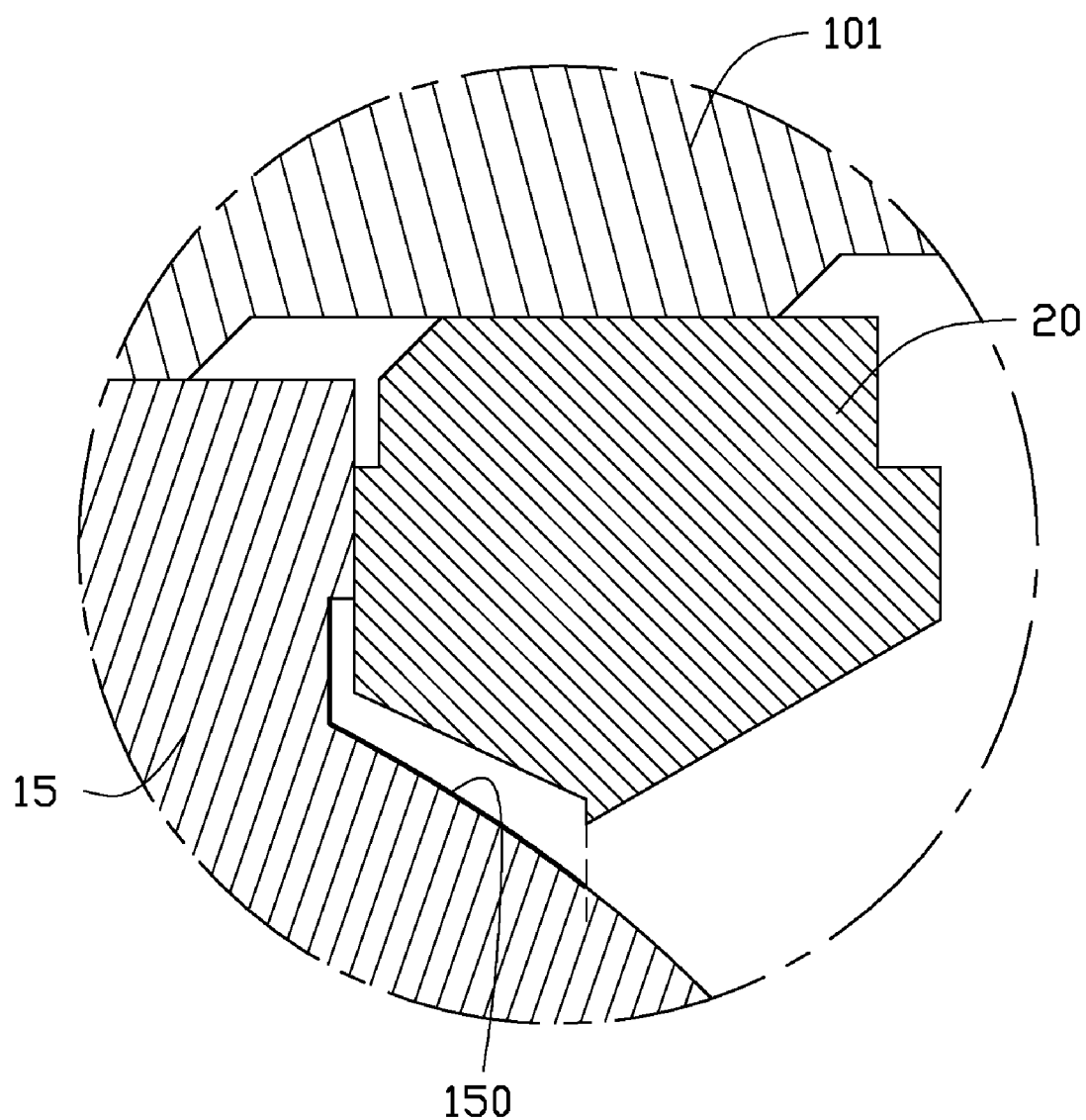
FIG. 5 is an enlarged view of a circled portion V of the lens module of FIG. 1.

Also referring to FIG. 5, the non-optical portion of the image-side surface of the fifth lens 15 has a nebulized surface 150 which is adjacent to the corresponding optical portion and not contacting the corresponding spacer 20. Thus, when the angle between the light source and the optical axis of the lens module 100 is about 38°, the shield-shaped astigmatism in the image of the light source can be eliminated.

In other embodiments, the number of the lens in the lens module 100 is not limited to this embodiment. Such as, more than one lens can be interposed between the second lens 12 and the fourth lens 14, the shape of the lens is similar to the shapes of the second lens 12, the fourth lens 14, and the fifth lens 15. The lens can be processed as the second lens 12, the fourth lens 14, and the fifth lens 15.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A lens module comprising:
   a barrel;
   a first lens;
   a second lens;
   a third lens; and
   a first spacer and a second spacer;
   wherein the first lens, the second lens, and the third lens are received in the barrel in an order from an object side to an image side of the lens module, each lens comprises an optical portion and a non-optical portion around the optical portion, each of the first and second spacers is positioned between the non-optical portions of two adjacent lenses, the non-optical portion of the second lens comprises a first contact portion and two second contact portions, the first contact portion contacts an inner sidewall of the barrel, the two second contact portions respectively contact the first lens and the third lens and are arranged in an acute angle with respect to an optical axis of the lens module, the non-optical portion of the second lens excluding the first contact portion and the two second contact portions is nebulized.

2. The lens module of claim 1, wherein the lens module further comprises a fourth lens and a fifth lens positioned on an image side of the third lens and received in the barrel in an order from the object side to the image side of the lens module, each of the fourth and fifth lenses comprises an optical portion and a non-optical portion around the optical portion, an intersecting portion between the optical portion and the non-optical portion of the fourth lens is nebulized.

3. The lens module of claim 2, wherein each of the fourth and fifth lenses comprises an object-side surface and an image-side surface, a circle having a center at the intersecting point of the optical portion and the non-optical portion on the image-side surface of the fourth lens is defined, the diameter of the circle is R1, a portion of the image-side surface of the fourth lens in the circle is nebulized, the barrel comprises an image end and an object end, an inner diameter of the barrel at the image end is D, where $0 < R1/D \leq 0.0566$.

4. The lens module of claim 3, wherein the non-optical portion of the fifth lens comprises an inclined surface on the object-side surface of the fifth lens adjacent to the optical portion of the fifth lens, an angle between the inclined surface and the optical axis of the lens module is $\theta$, $30° \leq \theta \leq 85°$, the inclined surface is nebulized.

5. The lens module of claim 4, wherein the lens module comprises a third spacer interposed between the fourth lens and the fifth lens, the inclined surface and the optical portion of the fifth lens are intersected to form an intersection point, the distance between the intersection point and an end of the third spacer adjacent to the optical axis of the lens module is D1, $0.0283 \leq D1/D \leq 0.0472$.

6. The lens module of claim 2, wherein the fifth lens comprises an object-side surface and an image-side surface, the lens module comprises a fourth spacer positioned on the image-side surface of the fifth lens, the non-optical portion of the fifth lens comprises a nebulized surface on the image-side surface of the fifth lens, the nebulized surface is adjacent to the optical portion of the fifth lens and separates from the fourth spacer.

* * * * *